Figure 1:
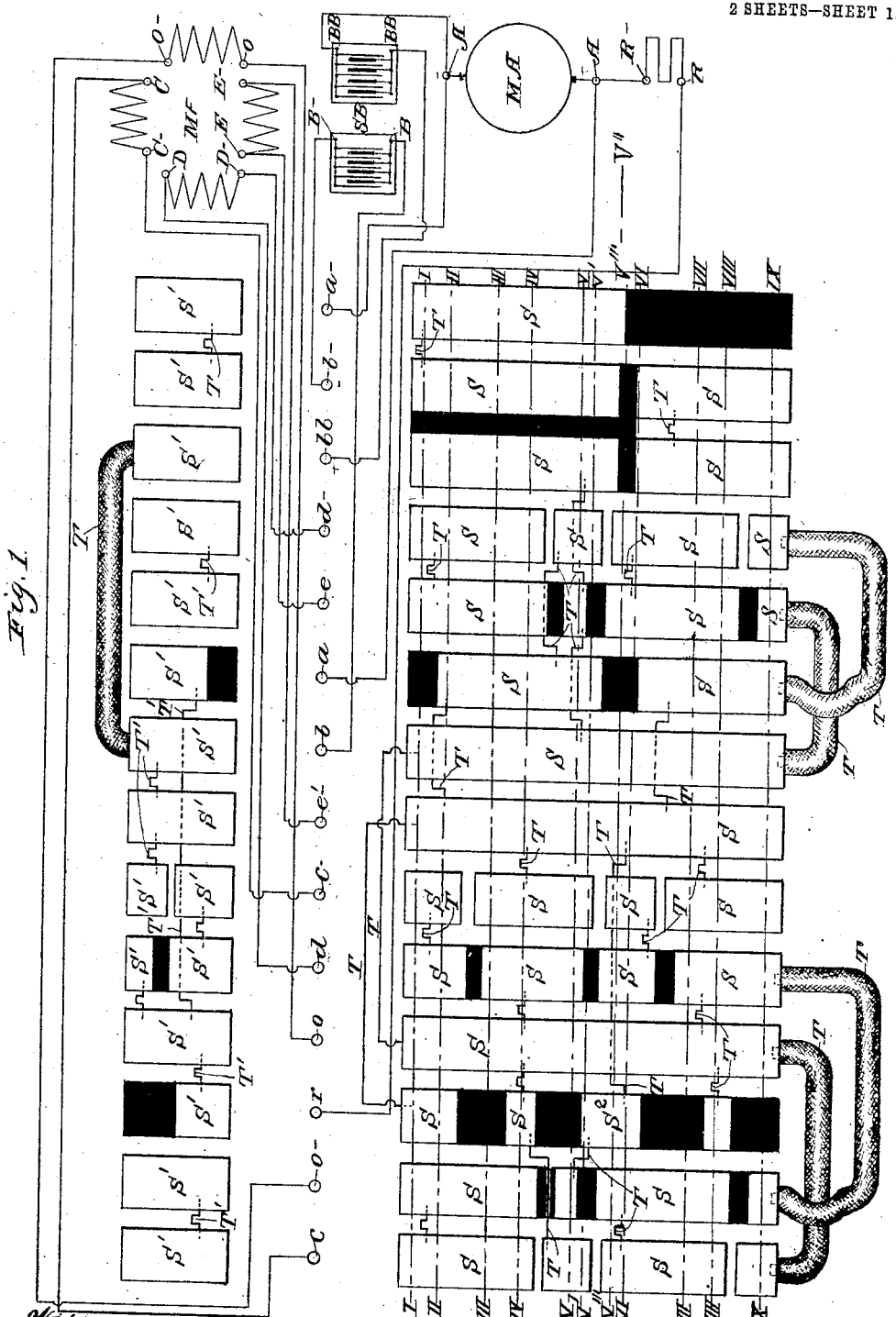

E. GRUENFELDT.
METHOD OF CONTROL FOR MOTOR SYSTEMS.
APPLICATION FILED JAN. 23, 1908.

913,282.

Patented Feb. 23, 1909.
2 SHEETS—SHEET 1.

Witnesses:
Inventor:
Emil Gruenfeldt
by W. E. Merkel, Attorney.

E. GRUENFELDT.
METHOD OF CONTROL FOR MOTOR SYSTEMS.
APPLICATION FILED JAN. 23, 1908.
913,282.
Patented Feb. 23, 1909.
2 SHEETS—SHEET 2.
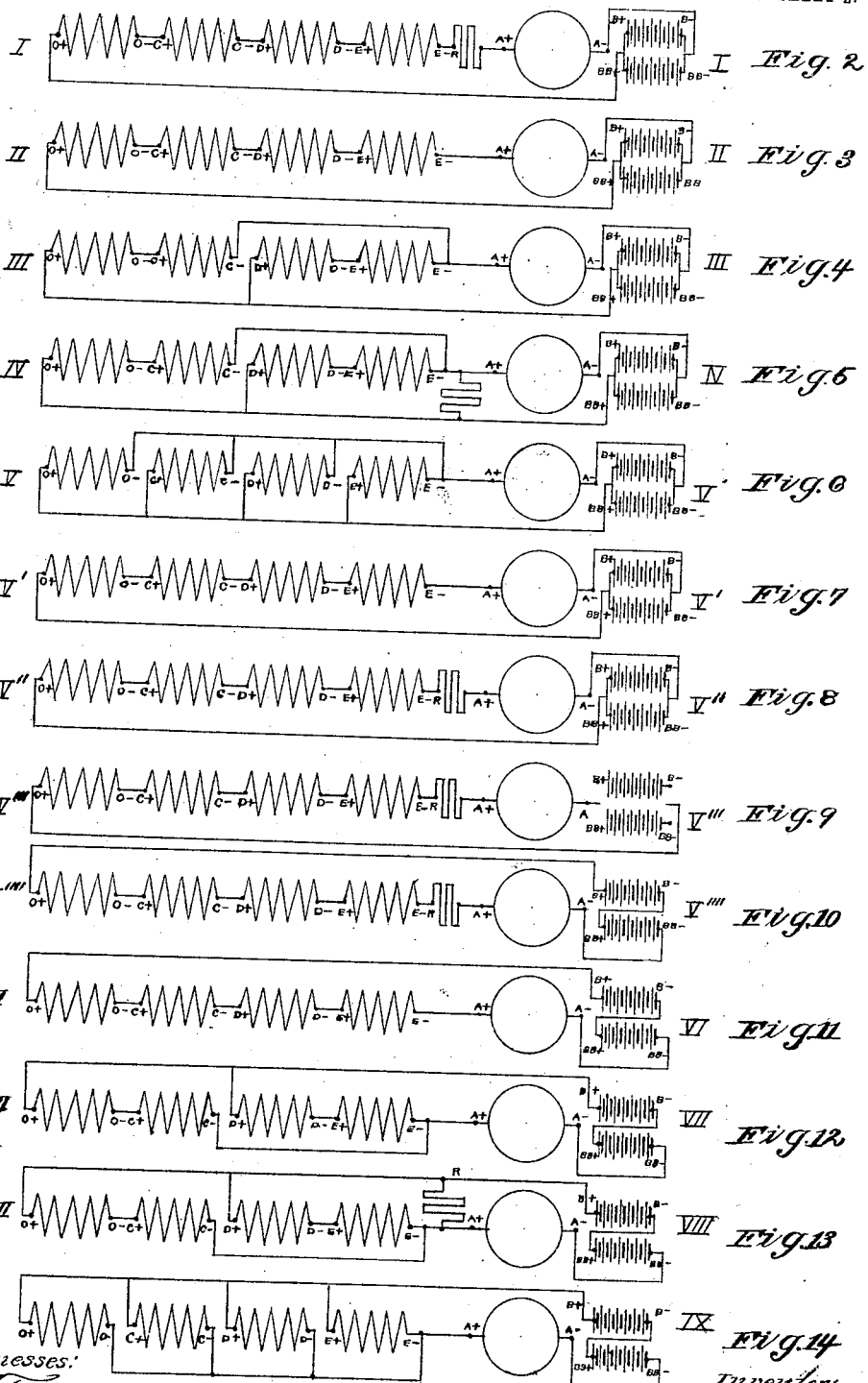

UNITED STATES PATENT OFFICE.

EMIL GRUENFELDT, OF CLEVELAND, OHIO, ASSIGNOR TO THE BAKER MOTOR VEHICLE COMPANY, OF CLEVELAND, OHIO, A CORPORATION OF OHIO.

METHOD OF CONTROL FOR MOTOR SYSTEMS.

No. 913,282.　　　Specification of Letters Patent.　　　Patented Feb. 23, 1909.

Application filed January 23, 1908. Serial No. 412,234.

To all whom it may concern:

Be it known that I, EMIL GRUENFELDT, a subject of the Emperor of Germany, resident of Cleveland, county of Cuyahoga, and State of Ohio, have invented a new and useful Improvement in Methods of Control for Motor Systems, of which the following is a specification, the principle of the invention being herein explained and the best mode in which I have contemplated applying that principle, so as to distinguish it from other inventions.

My invention relates to methods of control for motor systems including a series-wound motor, in which the current is changed from one voltage to a comparatively high voltage, its object being to effect such change in voltage in an economical and efficient manner and without sparking.

The said invention consists of a method hereinafter fully described and specifically pointed out in the claims.

The annexed drawings and the following description set forth in detail, one mode of carrying out the invention; the disclosed mode however constituting but one of various ways in which the principle of the invention may be applied.

In said annexed drawings:—Figure 1 represents a diagrammatic view of a series wound motor system which may be operated in accordance with the principles of my invention and illustrating a development of the controller used in such systems. Figs. 2 to 14 inclusive illustrate diagrammatically the connections between the batteries, motor, resistance and field-windings for the various punctuated and intermediate positions which are occupied by the controller throughout its range of operation, for effecting the different forward speeds.

Referring to Fig. 1, S S represent the controller segments which are mounted upon a suitable insulating cylinder in the usual manner and connected with each other by means of conductors T T in the manner indicated. These segments S are those which are used in making the connections for the forward speeds. The segments S' at the upper portion of the figure are those which are utilized in making the connections for the reverse speeds and are suitably connected with each other by means of conductors T' in the manner indicated. SB represents a storage battery divided into two sections, MA the armature of the motor and MF the field winding of the latter. As illustrated, the field winding of the motor is divided into four sections, the terminals of which are connected as shown. In this diagrammatic view the locations of the contact fingers of the controller with reference to each other and with reference to the segments of the controller when the latter is in its "off" position, are represented by $c, o^-, r, o^-, d, c^-, e^-, b, a, e, d^- b, b, b^-$, and $a^-$. The fingers $c$ and $c^-$ are connected with the positive and negative terminals C and $C^-$ of one of the field winding divisions, as shown. Fingers $d$ and $d^-$ are similarly connected with the positive and negative terminals respectively of another such division. Fingers $e$ and $e^-$ are similarly connected with the positive and negative terminals E $E^-$ respectively of a third division, and fingers $o$ and $o^-$ are similarly connected with the positive and negative terminals O and $O^-$ of the fourth division of the field winding. Finger $a$ is connected, as shown, with the positive terminal of the armature, and finger $r$ is connected with one terminal R of a non-inductive resistance, the other terminal $R^-$ of which is connected with the positive terminal of the armature as shown. Finger $b$ is connected with the positive terminal B of one of the battery sections and finger $b^-$ is connected with the negative terminal $B^-$ of same. Finger $b b$ is connected with the positive terminal B B of the other battery section, the negative terminal of such section being connected with the armature as shown. The controller is arranged to punctuate the positions indicated by lines I—I, II—II, III—III, IV—IV, V—V, VI—VI, VII—VII, VIII—VIII, IX—IX, by any suitable means such as the usual star-wheel mechanism.

It will be assumed that the battery sections are of equal capacity and that when connected in parallel they will produce 40 volts and when in series, 80 volts. Let it now be assumed that the controller is moved so as to bring the contact fingers $c, o^-$, etc. with reference to the segments of the controller, into the position indicated by line I—I. In this position the connections are those illustrated in Fig. 2, and it will be noted that the field winding sections are in series with the resistance and that the battery sections are in parallel. Therefore we have the highest resistance which the circuit can present and the lowest voltage, thereby obtaining the lowest speed of the motor. Let it now be assumed that the next step of the controller will bring the fingers upon the line II—II. In this position the connections are those illustrated in Fig. 3, and it will be noted that the resistance has been cut out of the circuit, but that otherwise the connections remain as in the position described in the first or lowest speed. The segments are so arranged that the next step of the controller will bring the fingers upon the line III—III. In this position the field sections are connected in series parallel as illustrated in Fig. 4, the remaining connections remaining as described when the motor is on 2d speed. This last named position gives a 3d speed higher than the 2d. On the 4th speed, the connections are as described in connection with the 3d speed with the exception that the resistance is shunted so as to increase the amount of current passing directly from the battery to the armature as shown in Fig. 5. Such arrangement gives us the 4th and an increased speed, the position of the fingers being indicated by line IV—IV. When the controller is next shifted so as to bring the fingers upon the line V—V, the connections are such as to cut out the resistance and arrange the field sections in parallel, the other connections remaining as in speed 3, as shown in Fig. 4.

The position of the fingers with reference to the controller segments for the 6th speed are indicated by line VI—VI in which it will be noted that the connections are such as to place the field windings in series and the batteries also in series as diagrammatically shown in Fig. 11, in which position the batteries give a current of 80 volts. Before the fingers reach the position in which the voltage is changed from low to high, they assume a series of intermediate positions, the connections for which are diagrammatically illustrated in Figs. 7, 8, 9 and 10, and which I shall now describe. When the fingers reach the position indicated by line V'—V', it will be noted that the segment S² is engaged by finger r. Immediately thereafter the initial steps in changing the field connections from parallel to the series relation as shown in Fig. 7, takes place, the entire current being sent through one field section at one period in the change and before the completion of such connection so as not to create a break in the circuit. A further movement now breaks the connection with the armature segment, thereby placing the resistance in the circuit. By the time the fingers reach the position indicated by line V''—V'' the field sections are connected in series as shown in said Fig. 7 and the resistance is also in series with such sections, as illustrated in Fig. 8, the low voltage battery connections being, however, maintained throughout such changes.

It will be noted that the connections last described are identical with the connections which were established for the first or lowest speed, as illustrated in Fig. 2, in which the highest resistance was established in the circuit by connecting the field windings in series and introducing the resistance in series therewith in addition. A further movement of the controller to impart to the fingers the position indicated by line V'''—V''', breaks the battery connections, the field winding, armature and resistance connections remaining as just described. This last arrangement of the connections is illustrated in Fig. 9. A further movement of the controller now brings the fingers into the position indicated by line V''''—V'''', in which the battery connections are reëstablished, but instead of being in parallel are now in series, as illustrated in Fig. 10, and are therefore arranged for maximum voltage. A further movement of the controller now brings the fingers into the punctuated position indicated by line VI—VI, the connections of which are illustrated in Fig. 11. At the instant the high voltage connections are made, in the positions above described and intermediate of the 5th and 6th speeds, the circuit is therefore arranged for maximum resistance and the amount of current which is therefore permitted to pass through the circuit is reduced to a minimum, thus also reducing the sparking incident to such change to a minimum. The resistance of the circuit is arranged so that when the connections are made for the 6th speed as described, the reduction in amperage of the current will be substantially in the same proportion as the increase in voltage which takes place as a result of throwing the two batteries into series with each other. The wattage consumption therefore on the 5th speed will be substantially equal to that on the 6th speed. Substantially the same speed is therefore obtained from the 6th position, illustrated in Fig. 10, as is obtained from the 5th, that is after changing from low to high voltage.

The wattage consumption of the apparatus when the controller occupies its 5th position being substantially the same as that of the parts when the controller occupies the 6th position and the speeds resulting from these two changes being substantially the same as above described, it will therefore be seen that by making the change from 5th to 6th positions quickly the momentum of the rotating parts which was obtained on 5th speed will not be caused to decrease before the connections for the 6th speed are made and after the 5th speed connections have been broken. This means that there will be practically no current consumed during such transition and that therefore the amount of sparking will be excedingly small at the instant of breaking the low voltage battery connections and of making the high voltage battery connections. The proper movement for effecting the intermediate positions illustrated in Figs. 7, 8, 9 and 10 is obtained by arranging the mechanical details of the controller so that the travel of the controller between the positions for 5th and 6th speeds is unpunctuated and hence continuous, as will be understood, and as explained in my co-pending application, Serial No. 412,236, filed even date herewith.

The resistance of the field windings is made such as to effect the above result, but to still further reduce even such slight sparking as would be obtained, the resistance is also introduced into the circuit in series as previously described before the low voltage connections are broken and the high voltage battery connections are made. Immediately after the high voltage connections are made, the resistance is cut out and we have the same field-winding and armature connections for the 6th speed as were obtained on the 2d speed. By so cutting out the resistance after effecting the connections described, loss of current due to continued use of resistance is eliminated at the same time making it possible to obtain a gradual increase of speed. A further step of the controller to bring the contact finger into the position indicated by lines VII—VII, VIII—VIII and IX—IX effect changes in the connections identical with those explained in connection with the 3d, 4th and 5th speeds in so far as concern the field armature and resistance. The connections for these last three positions are illustrated in Figs. 12, 13 and 14. Three additional speeds are thereby obtained.

In the arrangement illustrated, the segments S' S' are arranged to effect reverse connections identical with those made for the 1st, 2d and 3d speeds forward, and the segments and their connections are arranged accordingly as will be readily understood. The segments are so arranged as to accomplish the changes in field connections without breaking the current, by passing the latter during the changes through one part of the field. This is accomplished as heretofore by arranging the intervals between the alined segments as illustrated, wherein certain of such intervals are of a length such that the corresponding fingers may contact two successive segments at the same time. The longer intervals are filled with suitable insulating material as shown to bring them flush with the segments.

I therefore particularly point out and distinctly claim as my invention:

1. The method of control for motor systems including a series wound motor in which the current is changed from one voltage to a comparatively high voltage, which consists in reducing the amperage in the circuit in substantially the same proportion as the voltage is increased and making the connections which will effect such result before the low voltage connections are broken, then making the high voltage connections.

2. The method of control for a motor system including a series-wound motor in which the current is changed from one voltage to a comparatively high voltage, which consists in increasing the resistance of the motor field-windings, introducing a resistance in series with such windings, breaking the low voltage connections and then making the high voltage connections while the resistance is still in series.

3. The method of control for a motor system including a series-wound motor in which the current is changed from one voltage to a comparatively high voltage, which consists in changing the connection of the motor field-windings to produce a comparatively high resistance, breaking the low voltage connections and then making the high voltage connections while such windings are arranged for such high resistance.

4. The method of control for motor system including a series-wound motor in which the current is changed from one voltage to a comparatively high voltage, which consists in changing the resistance of the motor field-windings from the minimum to the maximum, breaking the low voltage connections and then making the high voltage connections while such windings are arranged for maximum resistance.

5. The method of control for motor systems including a series-wound motor in which the current is changed from one voltage to a comparatively high voltage, which consists in changing the field-windings from a parallel to a series relation, breaking the low voltage connections and then making the high voltage connections while such windings are arranged in series.

6. The method of control for motor systems including a series-wound motor in which the current is changed from one voltage to a comparatively high voltage, which consists in increasing the resistance of the motor field-windings therefor, introducing resistance into the circuit in series with such windings, breaking the low voltage connections, making the high voltage connections while the resistance is still in series, and then cutting out such resistance.

7. The method of control for motor systems including a series-wound motor which consists in reducing the amperage in the circuit below what it will be after the change to high voltage has been completed before the low voltage connections have been broken and maintaining such low amperage until the high voltage connections have been made; then increasing the amperage so as to make the ultimate decrease in amperage substantially proportionate to the increase in voltage.

Signed by me, this 21st day of January, 1908.

EMIL GRUENFELDT.

Attested by—
  WM. M. ROTHENBERG,
  A. E. MERKEL.